(12) United States Patent
Ihara

(10) Patent No.: US 7,717,528 B2
(45) Date of Patent: May 18, 2010

(54) RECORDING APPARATUS

(75) Inventor: Shoji Ihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 284 days.

(21) Appl. No.: 11/970,124

(22) Filed: Jan. 7, 2008

(65) Prior Publication Data

US 2008/0176123 A1 Jul. 24, 2008

(30) Foreign Application Priority Data

Jan. 24, 2007 (JP) ............................. 2007-014283

(51) Int. Cl.
*B41J 29/38* (2006.01)
*B41J 2/175* (2006.01)

(52) U.S. Cl. ............................................. 347/5; 347/86
(58) Field of Classification Search ...................... 347/5, 347/86

See application file for complete search history.

(56) References Cited

U.S. PATENT DOCUMENTS 6,893,119 B2 * 5/2005 Ushiro ........................ 347/86
6,918,642 B2 * 7/2005 Horigome .................... 347/5
2006/0256173 A1 * 11/2006 Tatsumi et al. ............... 347/86

FOREIGN PATENT DOCUMENTS

JP 2005-262592 9/2005

\* cited by examiner

*Primary Examiner*—Julian D Huffman
(74) *Attorney, Agent, or Firm*—Fitzpatrick, Cella, Harper & Scinto

(57) ABSTRACT

A recording apparatus, which operates by using a fuel cell as a power source, for performing recording with a printing material, includes a printing material storing portion for storing the printing material; a fuel tank for storing a fuel to be supplied to the fuel cell; a power generation portion of the fuel cell, for outputting electric power generated by the fuel supplied from the fuel tank to the recording apparatus; a heating portion for consuming the fuel from the fuel tank; and a control portion for performing control so that an excess amount of the fuel can be supplied to the heating portion such that when the printing material in the printing material storing portion is exhausted, the fuel in the fuel tank is also exhausted.

5 Claims, 4 Drawing Sheets

RECORDING APPARATUS

BACKGROUND OF THE INVENTION

1. Field of the Invention

The present invention relates to a recording apparatus which can operate by using a fuel cell as a power source.

2. Description of the Related Art

Fuel cells directly obtain an electric energy from a chemical energy by electrochemically reacting a fuel such as hydrogen or methanol with oxygen. Accordingly, there is an expectation that, as power sources having high power generation efficiency, the fuel cells have a wide range of applications to power sources for portable devices, distributed power sources for electric vehicles, institutional use, or domestic use, or the like.

In the fuel cells, since an energy density of hydrogen itself is high and an active substance on a cathode side is not necessary because oxygen is taken in from the external air, an energy capacity per volume and per weight can be dramatically increased compared to a conventional battery.

Of those fuel cells, a polymer electrolyte fuel cell employing a polymer electrolyte membrane having proton conductivity can be operated at about room temperature, and is particularly suitable for downsizing.

Conventionally, in Japanese Patent Application Laid-Open No. 2005-262592, there is a suggestion to use the polymer electrolyte fuel cell of this type as a power source for a printer (recording apparatus).

When the printer is operated by the fuel cell, even in an environment such as outdoors, in which ac power cannot be received from a commercial outlet, a printing processing can be performed.

However, the printer according to Japanese Patent Application Laid-Open No. 2005-262592 as the conventional example has the following problems.

That is, an amount of fuel used by the fuel cell changes depending on operating conditions of the printer, so timings at which the ink and the fuel are exhausted generally differ from each other.

Therefore, for example, when the fuel is exhausted during printing, power generation by the fuel cell cannot be performed at this time point, so there arises a problem of printer stop.

Further, for example, in a case where an ink cartridge and a fuel tank are used while being integrated into a single body, when one of the ink and the fuel is exhausted to be replenished with a new ink or fuel is to be performed, there arises a problem in that one of the fuel and the ink, which still remains, is inevitably discarded.

A further description thereof is made as follows. That is, the polymer electrolyte fuel cell performs the power generation by using hydrogen or methanol as the fuel and by reacting the hydrogen or methanol with oxygen in air. In order to realize this, the fuel has to be supplied.

In a case where the printer is operated by the fuel cell, when the fuel is exhausted during printing, the power generation by the fuel cell cannot be performed at this time point, and there arises a problem in that the printer is stopped and a printing operation is interrupted.

Further, for example, in the case where the ink cartridge and the fuel tank are used while being integrated into the single body, when the fuel which has been exhausted during printing is replenished the expensive ink is discarded, thereby causing an increase in running costs of the printer.

On the other hand, the fuel is normally less expensive than the ink. However, when a sufficient amount of the fuel is stored so that the ink is exhausted earlier than the fuel, the fuel has to be discarded when replacing the cartridge.

The discarding of the fuel consumes time and effort and involves high costs, thereby being extremely inconvenient.

Further, in a case of using methanol as the fuel, there is a need of taking a countermeasure for toxicity, so extra costs are further required.

SUMMARY OF THE INVENTION

The present invention is directed to a recording apparatus which operates by using a fuel cell as a power source, for performing recording by a printing material, and in which, when the printing material in a printing material storing portion is exhausted, a fuel in a fuel tank can also be exhausted.

The present invention provides the recording apparatus structured as described below.

According to the present invention, there is provided a recording apparatus, which operates by using a fuel cell as a power source, for performing recording by a printing material, including: a printing material storing portion for storing the printing material; a fuel tank for storing a fuel to be supplied to the fuel cell; a power generation portion of the fuel cell, for outputting electric power generated by the fuel supplied from the fuel tank to the recording apparatus; a heating portion for consuming the fuel from the fuel tank; and a control portion for performing control so that an excess amount of the fuel can be supplied to the heating portion such that when the printing material in the printing material storing portion is exhausted, the fuel in the fuel tank is also exhausted.

Further, in a recording apparatus according to the present invention, the printing material storing portion and the fuel tank are integrated into a single body which is detachable from the recording apparatus.

Further, a recording apparatus according to the present invention further includes a fuel buffer tank for the fuel tank, capable of storing the fuel in the fuel tank.

Further, in a recording apparatus according to the present invention, the heating portion is disposed in a position where the power generation portion of the fuel cell can be heated by the heating portion.

Further, in a recording apparatus according to the present invention, the fuel to be supplied to the fuel cell includes one of hydrogen and methanol.

According to the present invention, in the recording apparatus which operates by using the fuel cell as the power source, for performing recording by the printing material, when the printing material in the printing material storing portion is exhausted, the fuel in the fuel tank can also be exhausted.

Further features of the present invention will become apparent from the following description of exemplary embodiments with reference to the attached drawings.

DESCRIPTION OF THE EMBODIMENTS

A detailed description will be made of a recording apparatus according to an embodiment of the present invention.

Note that, hereinafter, a description will be made of a case of a printer as an example of the recording apparatus, in which ink is used as a printing material. However, there can be used, as the printing material, any material other than the ink, which is consumed along with progress of a printing processing, for example, a toner. The present invention can be applied to any recording apparatus which performs recording while consuming the printing material.

Embodiment 1

In Embodiment 1 of the present invention, a description will be made of a recording apparatus to which the present invention is applied, and which operates by using a fuel cell as a power source, for performing recording by a printing material.

Figure 1:
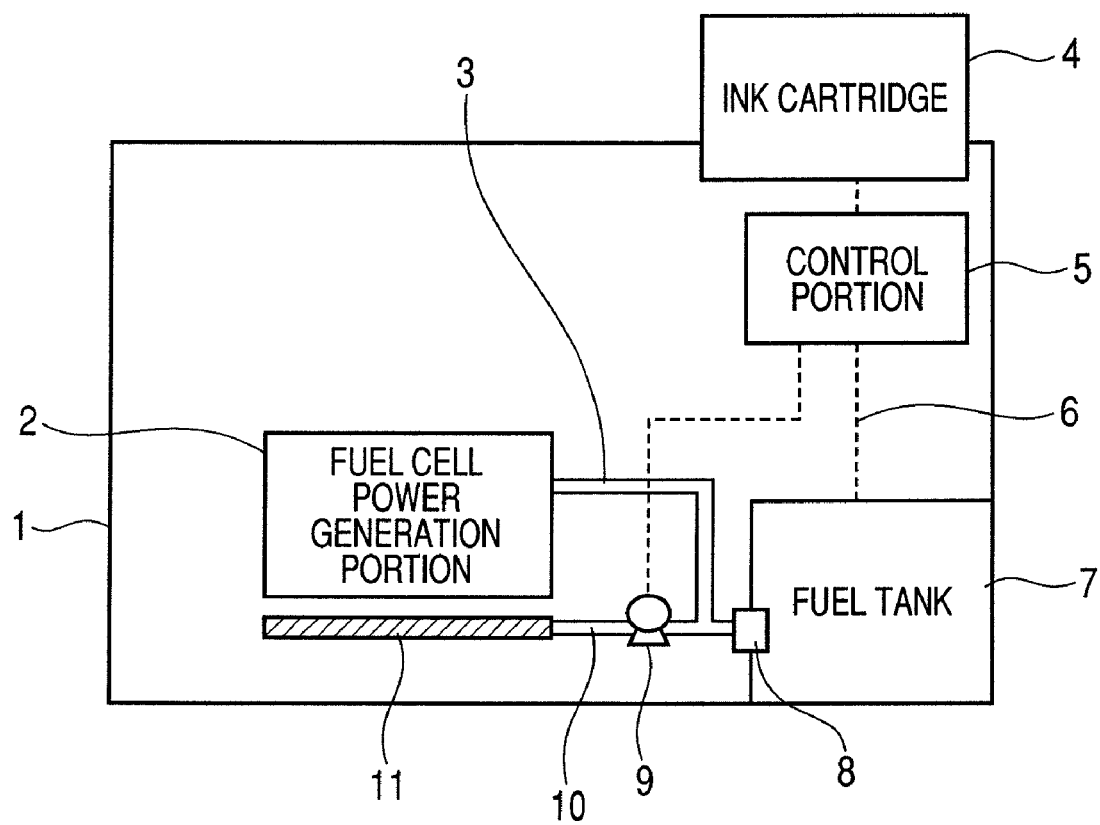
FIG. 1 is a block diagram for illustrating a structure of a recording apparatus according to Embodiment 1 of the present invention.

FIG. 1 is a block diagram for illustrating a structure of a recording apparatus according to this embodiment. FIG. 1 illustrates a recording apparatus 1, a power generation portion 2 of the fuel cell, a first fuel supply path 3, an ink cartridge 4, a control portion 5, signal lines 6, a fuel tank 7, a fuel tank mounting unit 8, a fuel sending unit 9, a second fuel supply path 10, and a heating portion 11.

In the recording apparatus 1 having the above-mentioned structural portions of this embodiment, the power generation portion 2 of the fuel cell generates, by a fuel cell reaction between a fuel in the fuel tank 7 and oxygen in air, electric power for operating the recording apparatus 1.

Further, by the first fuel supply path 3, the fuel is supplied from the fuel tank 7 to the power generation portion 2 of the fuel cell through the intermediation of the fuel tank mounting unit 8.

The fuel tank 7 has a structure which is removable from the fuel tank mounting unit 8. The fuel in the fuel tank 7 may be any material which can be used for a power generation reaction in the power generation portion 2 of the fuel cell, such as hydrogen and a methanol aqueous solution.

When hydrogen is used as the fuel, in a case where a hydrogen storage alloy is stored in the fuel tank 7, the hydrogen can be stored in a small container with high efficiency.

The power generation portion 2 of the fuel cell is a polymer electrolyte fuel cell stack structured by laminating a fuel cell in which on both sides of the polymer electrolyte membrane which is a proton exchange membrane, there are provided a fuel electrode and an oxidizer electrode each having a catalyst such as platinum or the like, respectively. The fuel stored in the fuel tank 7 is used to perform the power generation.

A method of sending the fuel from the fuel tank 7 to the power generation portion 2 of the fuel cell can be performed by a commonly known technology such as a valve and a pump depending on the fuel in the fuel tank 7.

In the heating portion 11, the fuel in the fuel tank 7 is oxidized by utilizing the catalyst such as platinum. As a result, the fuel is consumed without being used for the power generation. In order to consume the fuel in oxidation reaction, along with consumption of the fuel, heat is generated.

The fuel is sent out by the fuel sending unit 9 to the heating portion 11, and the fuel is delivered through the second fuel supply path 10 to the heating portion 11.

The heating portion 11 is disposed in a position where a cathode of the power generation portion of the fuel cell can be heated by the heating portion 11. Water vapor generated when the fuel is reacted with oxygen in the air in the power generation portion 2 of the fuel cell is cooled by an atmosphere in or in the vicinity of the recording apparatus 1 to be effectively diffused into the atmosphere without causing dew condensation by heat of the power generation portion 11.

The ink is stored by the ink cartridge 4 serving as a printing material storing portion for storing the printing material. The ink in the ink cartridge 4 is used when the recording apparatus 1 performs a printing processing. The control portion 5 is connected to each of the ink cartridge 4, the fuel tank 7, and the fuel sending unit 9 through the signal lines 6.

An ink remaining amount in the ink cartridge 4 serving as the printing material storing portion for storing the printing material and a fuel remaining amount in the fuel tank 7 can be detected by the control portion 5 through the signal lines 6.

The detection of the ink remaining amount and the fuel remaining amount can be performed by commonly known methods such as an optical detection method in which measurement is performed for light transmitted through the each tank or a physical detection method in which a weight of the each tank is measured.

The fuel sending unit 9 is structured such that a predetermined amount of fuel can be supplied to the heating portion under the control of the control portion.

The fuel sending unit 9 can be formed of a commonly known unit such as a pump.

A description will be made of a processing of the control portion according to this embodiment.

Figure 2:
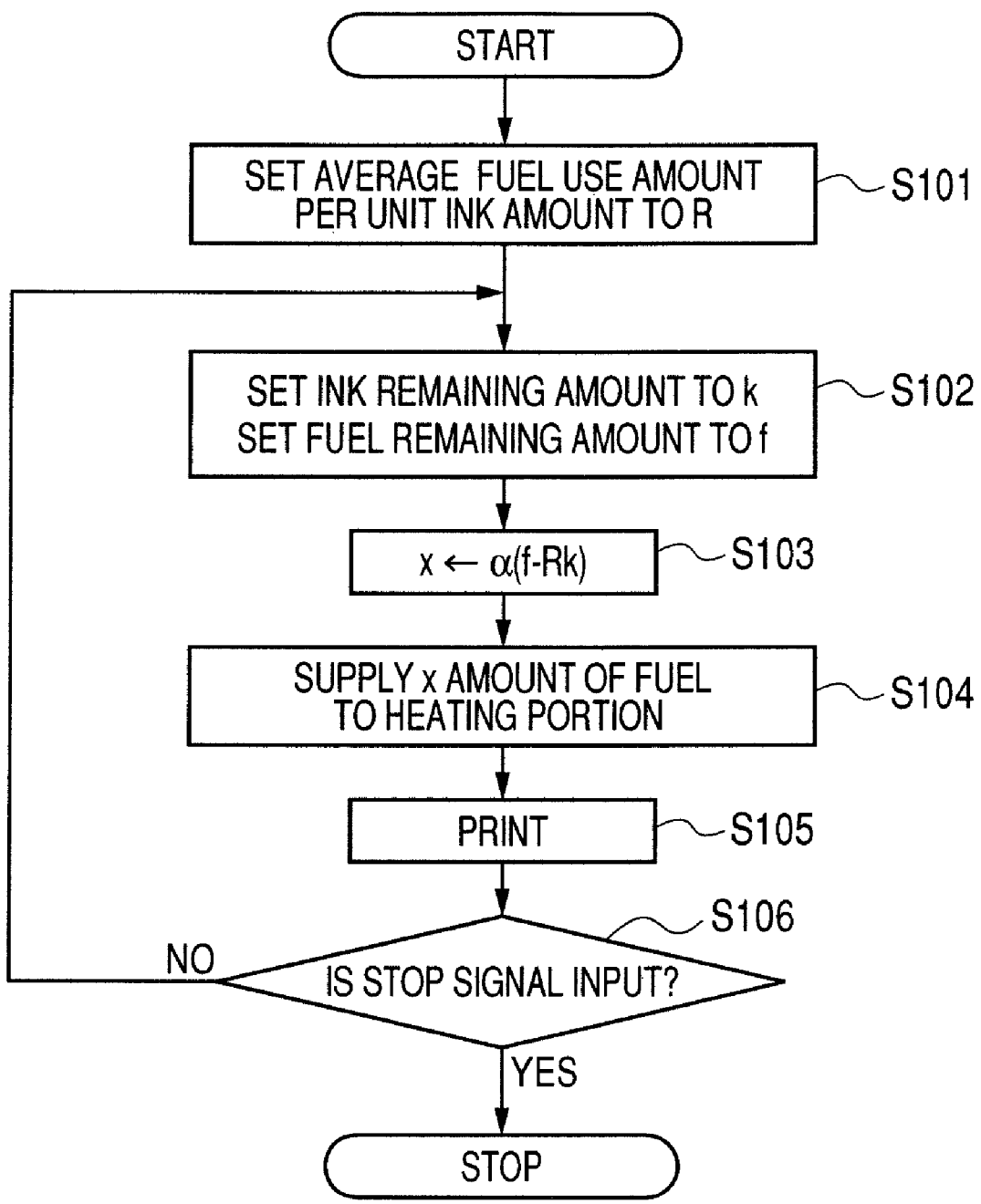
FIG. 2 is a flow chart for illustrating a processing of a control portion according to Embodiment 1 of the present invention.

FIG. 2 is a flow chart for illustrating the processing of the control portion according to this embodiment. The recording apparatus consumes the electric power generated by the fuel cell for performing the printing processing. A required electric power amount changes depending on operating conditions or printing conditions of the recording apparatus.

An average fuel use amount per unit ink amount is set to R in Step S101, which is determined from an average electric power use amount required for performing the printing processing in which the unit ink amount is consumed and a fuel use amount required for the fuel cell to generate the electric power.

In Step S102, the ink remaining amount in the ink cartridge 4 is set to k, and the fuel remaining amount in the fuel tank 7 is set to f.

In this case, Rk represents an estimated value of a required fuel amount for exhausting all the current ink remaining amount in printing. Accordingly, an expression f-Rk yields an excess amount of the fuel currently existing in the fuel tank with respect to the estimated value of the required fuel amount.

The fuel amount actually required for exhausting the ink remaining amount k in the printing may possibly vary from the estimated value.

Accordingly, a value obtained by multiplying the excess amount by a predetermined ratio $\alpha(0<\alpha<1)$ is set to x (Step S103).

In Step S104, the fuel sending unit 9 is controlled by a signal from the control portion 5 to supply an x amount of the fuel to the heating portion 11.

The printing processing for a predetermined amount (for example, printing processing for one page) is performed in Step S105. After that, in Step S106, whether or not a stop signal is input is determined.

In a case where the stop signal is not input (in a case of NO), the processing returns to the Step S102 to be repeated.

In a case where it is determined that the stop signal is input in Step S106 (in a case of YES), the processing is terminated.

Figure 3:
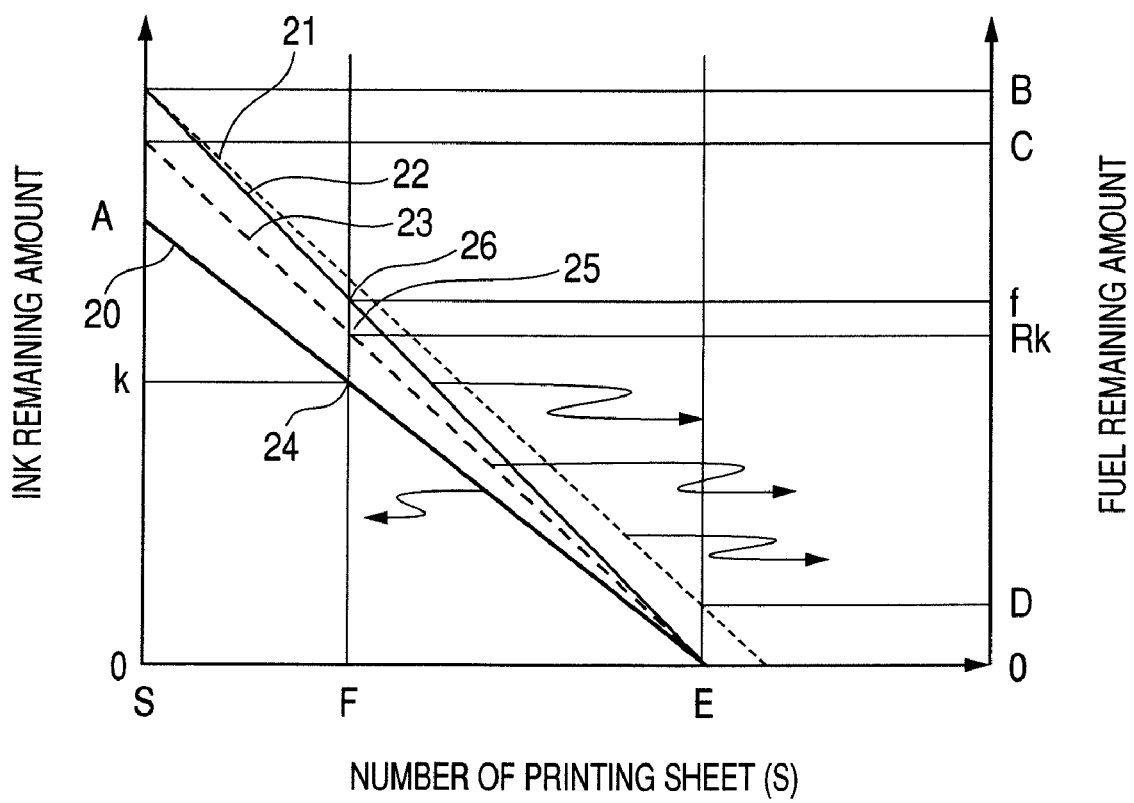
FIG. 3 is a graph for illustrating changes in fuel remaining amount and ink remaining amount according to Embodiment 1 of the present invention.

FIG. 3 is a view for illustrating changes in fuel remaining amount and ink remaining amount according to this embodiment.

In FIG. 3, a left vertical axis indicates the ink remaining amount and a right vertical axis indicates the fuel remaining amount.

A horizontal axis indicates the number of printing sheet(s) since the ink cartridge 4 and the fuel tank 7 have been mounted.

On the horizontal axis, a point S indicates a time point at which the ink in the ink cartridge 4 and the fuel in the fuel tank 7 are started to be supplied, and a point E indicates a time point at which the ink in the ink cartridge 4 is exhausted.

In FIG. 3, a graph illustrating reduction in ink remaining amount is denoted by reference numeral 20, and a graph (solid line) illustrating reduction in fuel remaining amount in a case where this embodiment is carried out is denoted by reference numeral 22.

A graph (dotted line) illustrating reduction in fuel remaining amount in a case where this embodiment is not carried out is denoted by reference numeral 21, and a graph (broken line) illustrating the estimated value (Rk) of the fuel required for exhausting all the ink remaining amount k in the printing processing is denoted by reference numeral 23.

An amount of the ink stored in the ink cartridge 4 at the time of mounting is A, and an amount of the fuel stored in the fuel tank 7 at the time of mounting is B.

An estimated value of the fuel required for exhausting the ink amount A in the printing is C (=RA).

However, the amount of the fuel actually required varies depending on various conditions. Accordingly, in order to reliably perform the printing processing for exhausting all the ink, in consideration of the various conditions, it is necessary that the amount B of the fuel, which is larger than the amount C, be stored in the fuel tank 7.

The point E on the horizontal axis is a point at which the ink remaining amount becomes 0. As illustrated in FIG. 3, when this embodiment is carried out, the fuel remaining amount becomes 0 at the same time.

On the other hand, when this embodiment is not carried out, a fuel remaining amount D of the fuel remains in the fuel tank 7 at the point E.

The fuel remaining amount D varies depending on the actual operation of the recording apparatus. When the fuel required for the printing is at an average, the fuel remaining amount D is exactly equal to a value obtained by an expression B-C.

Next, a description will be made of meanings of parameters in the flow chart of FIG. 2 as to a time point F in the printing processing with reference to FIG. 3.

In FIG. 3, the ink remaining amount k is denoted by reference numeral 24, the fuel remaining amount f is denoted by reference numeral 26, and the estimated value Rk of the fuel required for exhausting the ink remaining amount k in the printing is denoted by reference numeral 25.

Accordingly, a difference between values represented by reference numerals 26 and 25 corresponds to the excess fuel amount (f-Rk). The predetermined ratio ($\alpha$) of the excess fuel is consumed by the heating portion.

As can be understood from FIG. 3, the amount of the excess fuel in the processing of this embodiment is reduced along with progress of the printing processing, and at the time when the ink remaining amount becomes 0, the fuel remaining amount becomes 0 at last.

Embodiment 2

In Embodiment 2, a description will be made of a structural example in which the printing material storing portion and the fuel tank 7 are integrated into one to be detachable from the recording apparatus 1 and there is provided a fuel buffer tank.

In Embodiment 1, the ink cartridge 4 and the fuel tank 7 are provided separately from each other to be mounted to different places of the recording apparatus 1.

When a user handles the ink cartridge 4 and the fuel tank 7, in order to facilitate the handling thereof and to prevent errors, the printing material storing portion and the fuel tank 7 should rather be integrated into one to be detachable from the recording apparatus, thereby being convenient.

On the other hand, in a recording apparatus such as an ink jet printer, the ink cartridge is mounted to a print head which moves during the printing process in many cases.

In this case, in order to increase a printing speed, the print head should be structured to be as light as possible to decrease a moment of inertia involved in the movement of the print head.

Therefore, in the case where the fuel tank and the ink cartridge are integrated into one, there is required a countermeasure against increase in weight of the print head due to the fuel weight.

The structural example in which the countermeasure is taken to integrate the ink cartridge and the fuel tank into a single body, will be described as Embodiment 2.

Figure 4:
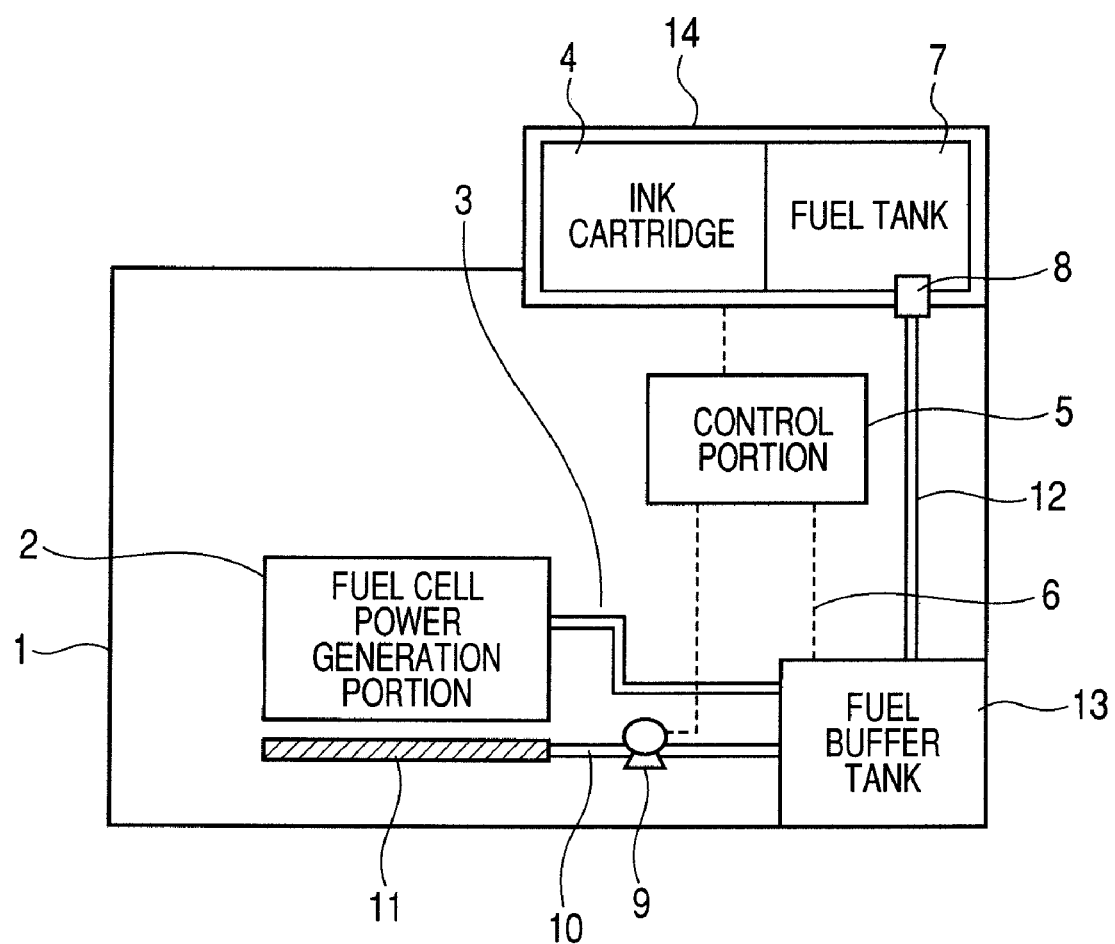
FIG. 4 is a block diagram for illustrating a structure of a recording apparatus according to Embodiment 2 of the present invention.

FIG. 4 is a block diagram for illustrating a structure of the recording apparatus according to this embodiment.

In FIG. 4, the same components as those of Embodiment 1 of the present invention are denoted by the same reference numerals.

A fuel moving path 12 for moving the fuel in the fuel tank 7 to the fuel buffer tank 13 is connected to the fuel tank 7 through the intermediation of the fuel tank mounting unit 8 in a detachable manner.

The fuel buffer tank 13 is provided in the recording apparatus 1 and has a capacity for storing the total fuel in the fuel tank 7.

A replacement cartridge 14 stores therein the ink cartridge 4 and the fuel tank 7 and is detachable from the recording apparatus 1.

In this embodiment, such a structure is realized by a commonly known method that when the replacement cartridge 14 is attached to the recording apparatus 1, the total fuel in the fuel tank 7 moves to the fuel buffer tank 13.

The fuel in the fuel tank 7 is moved to the fuel buffer tank 13, thereby enabling minimizing the increase in weight of the print head even when the replacement cartridge is attached to the print head of the recording apparatus.

In FIG. 4, a fuel supply path for supplying the fuel from the fuel buffer tank 13 to the power generation portion 2 of the fuel cell is denoted by reference numeral 3.

In the power generation portion 2 of the fuel cell, by the fuel cell reaction between the fuel in the fuel buffer tank 13 and oxygen in the air, electric power for operating the recording apparatus 1 is generated to be output to the recording apparatus 1.

The ink remaining amount in the ink cartridge 4 and the fuel remaining amount in the fuel buffer tank 13 can be detected by the control portion 5 through the signal lines.

The detection of the ink remaining amount and the fuel remaining amount can be performed by commonly known methods such as an optical detection method in which measurement is performed for light transmitted through the each tank and a physical detection method in which a weight of each tank is measured. The fuel sending unit 9 can supply a predetermined amount of the fuel to the heating portion under the control of the control portion.

The fuel sending unit 9 can be structured by a commonly known method using a pump or the like.

The process by the control portion in this embodiment can be performed in exactly the same manner except that the fuel tank 7 of Embodiment 1 is replaced with the fuel buffer tank 13.

Note that, in the above Embodiments 1 and 2, the descriptions are made with the case where the ink is employed as the printing material of the recording apparatus. However, the present invention can be carried out by using any printing material other than the ink, which is consumed along with progress of the printing processing, such as a toner.

As described above, according to the above Embodiments 1 and 2, the control is performed so that the excess fuel can be supplied to the heating portion such that when the printing material in the printing material storing portion is exhausted, the fuel in the fuel tank is also exhausted.

Thus, in a case where a new printing material is supplied after the printing material is completely consumed, the fuel can be newly supplied at the same timing as that of the printing material without being concerned about discarding of the remaining fuel of the recording apparatus.

Further, owing to the structure in which the heating portion is disposed in the position capable of heating the cathode of the power generation portion of the fuel cell, water vapor generated in the fuel cell power generation can be diffused to the outside of the recording apparatus.

That is, depending on the operating conditions of the recording apparatus, when the fuel remaining amount is excessive with respect to the printing material remaining amount, the excess fuel can be successively used for the heating processing of the heating portion to allow the water vapor generated in the fuel cell power generation to be diffused to the outside of the recording apparatus.

As a result, the water vapor can be prevented, for example, from forming dew on the recording apparatus by being cooled by the atmosphere in or in the vicinity of the recording apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-014283, filed Jan. 24, 2007, which is hereby incorporated by reference herein in its entirety.

What is claimed is:

1. A recording apparatus, which operates by using a fuel cell as a power source, for performing recording with a printing material, comprising:
    a printing material storing portion for storing the printing material;
    a fuel tank for storing a fuel to be supplied to the fuel cell;
    a power generation portion of the fuel cell, for outputting electric power, generated by the fuel supplied from the fuel tank, to the recording apparatus;
    a heating portion for consuming the fuel from the fuel tank; and
    a control portion for performing control so that an excess amount of the fuel can be supplied to the heating portion such that when the printing material in the printing material storing portion is exhausted, the fuel in the fuel tank is also exhausted.

2. The recording apparatus according to claim 1, wherein the printing material storing portion and the fuel tank are integrated into a single body which is detachable from the recording apparatus.

3. The recording apparatus according to claim 2, further comprising a fuel buffer tank for the fuel tank, capable of storing the fuel in the fuel tank.

4. The recording apparatus according to claim 1, wherein the heating portion is disposed in a position where the power generation portion of the fuel cell can be heated by the heating portion.

5. The recording apparatus according to claim 1, wherein the fuel to be supplied to the fuel cell comprises one of hydrogen and methanol.

* * * * *